(12) United States Patent
Sun et al.

(10) Patent No.: US 10,017,421 B2
(45) Date of Patent: Jul. 10, 2018

(54) METHOD FOR PREPARING ACTIVE CALCIUM SILICATE

(71) Applicant: DATANG INTERNATIONAL HIGH ALUMINA COAL R & D CENTER, Erdos (CN)

(72) Inventors: Junmin Sun, Erdos (CN); Chenghai Wang, Erdos (CN); Zhanjun Zhang, Erdos (CN); Yang Chen, Erdos (CN); Zhijun Gao, Erdos (CN); Xiaofen Wei, Erdos (CN); Peng Xu, Erdos (CN)

(73) Assignee: DATANG INTERNATIONAL HIGH ALUMINA COAL R & D CENTER, Inner Mongolia (CN)

( * ) Notice: Subject to any disclaimer, the term of this patent is extended or adjusted under 35 U.S.C. 154(b) by 387 days.

(21) Appl. No.: 15/058,697

(22) Filed: Mar. 2, 2016

(65) Prior Publication Data

US 2016/0176761 A1   Jun. 23, 2016

Related U.S. Application Data

(63) Continuation of application No. PCT/CN2015/084282, filed on Jul. 17, 2015.

(30) Foreign Application Priority Data

Jul. 18, 2014   (CN) .......................... 2014 1 0344132

(51) Int. Cl.
    *C04B 28/24*   (2006.01)
    *C01B 33/24*   (2006.01)
    *C04B 28/18*   (2006.01)
    *C04B 18/08*   (2006.01)

(52) U.S. Cl.
    CPC .............. *C04B 28/24* (2013.01); *C01B 33/24* (2013.01); *C04B 18/08* (2013.01); *C04B 28/18* (2013.01); *C01P 2006/10* (2013.01); *C01P 2006/11* (2013.01); *C01P 2006/12* (2013.01); *C01P 2006/19* (2013.01); *Y02W 30/92* (2015.05)

(58) Field of Classification Search
    CPC ......... C01B 33/24; C04B 12/04; C04B 18/08; C04B 20/023; C04B 22/16; C04B 24/2641; C04B 28/18; C04B 28/24; C01P 2006/10; C01P 2006/11; C01P 2006/12; C01P 2006/19
    See application file for complete search history.

(56) References Cited

FOREIGN PATENT DOCUMENTS

| CN | 1634767 A | 7/2005 |
|---|---|---|
| CN | 1884085 A | 12/2006 |
| CN | 102249253 A | 11/2011 |
| CN | 102417187 A | 4/2012 |
| CN | 102583410 A * | 7/2012 |
| CN | 102674425 A | 9/2012 |
| CN | 103145136 A | 6/2013 |
| CN | 103332693 A | 10/2013 |
| CN | 103332697 A | 10/2013 |
| CN | 103333369 A | 10/2013 |
| CN | 104085896 A | 10/2014 |
| CN | 104878649 A * | 9/2015 |
| CN | 105839188 A * | 8/2016 |

OTHER PUBLICATIONS

International Search Report of corresponding International PCT Application No. PCT/CN2015/084282, dated Oct. 9, 2015.

* cited by examiner

*Primary Examiner* — Anthony J Green
(74) *Attorney, Agent, or Firm* — J.C. Patents

(57) ABSTRACT

The present invention provides a method for preparing an active calcium silicate. The method comprises: mixing a lime milk, a fly ash desilicated liquid and a particle diameter control agent and reacting them, to obtain a active calcium silicate slurry. The particle diameter control agent is one of a pyrophosphoric acid salt, a metaphosphoric acid salt, a polyphosphoric acid salt, a polyacrylic acid ester, and a polyacrylic acid salt. The preparation method of the present invention can efficiently reduce large particles of the active calcium silicate, so as to reduce the influence of the large particles on papermaking process and paper quality.

9 Claims, No Drawings

METHOD FOR PREPARING ACTIVE CALCIUM SILICATE

CROSS-REFERENCE TO RELATED APPLICATIONS

This application is a continuation of International Application No. PCT/CN2015/084282, filed on Jul. 17, 2015, which claims the priority benefit of China Patent Application No. 201410344132.6, filed on Jul. 18, 2014. The contents of the above identified applications are incorporated herein by reference in their entireties.

TECHNICAL FIELD

The present invention relates to a method for preparing active calcium silicate, and belongs to the field of non-metallic mineral processing and application.

BACKGROUND

Active calcium silicate has the advantages of high porosity and strong adsorption and thus it is an excellent paper making material, and may be used as paper functional filler, retention agent and thickening agent in paper production.

Studies have shown that the main reason for active calcium silicate having such properties lies in that the active calcium silicate in the form of powder particles is honeycomb micron particles composed of nano-lamellar bodies combined with each other. However, the nano-lamellar bodies have edges which show strong nano-properties and adsorption with each other. Thus they are easy to agglomerate and generate large flocculated particles. For a paper making system, large flocculated particles generated by active calcium silicate particles agglomeration will result in difficult sieving during production, and meanwhile the large flocculated particles in the active calcium silicate entry into paper is easy to cause powder-dropping of paper and paste version in printing process. Therefore, in order to improve the functional properties of the active calcium silicate, their particle diameter must be controlled, to reduce or eliminate large flocculated particles generated in the active calcium silicate as far as possible and meanwhile reduce particle diameter of the active calcium silicate.

SUMMARY

An object of the present invention is to provide a method for preparing active calcium silicate, so as to solve the problem of high content of large particles of active calcium silicate due to flocculation, effectively reducing large particles of the active calcium silicate and reducing the average particle diameter of the active calcium silicate particles, thereby reducing the influence of the large particles on the paper making process and paper quality.

The above object of the present invention is achieved by the following technical solutions.

The present invention provides a method for preparing an active calcium silicate, comprising: mixing a lime milk, a fly ash desilicated liquid and a particle diameter control agent and reacting them, drying the resulting product slurry to obtain the active calcium silicate. The particle diameter control agent is one selected from a pyrophosphoric acid salt, a metaphosphoric acid salt, a polyphosphoric acid salt, a polyacrylic acid ester, and a polyacrylic acid salt.

Wherein, the pyrophosphoric acid salt, the metaphosphoric acid salt or the polyphosphoric acid salt has an addition amount of 0.2-2.5% based on total dry weight of the fly ash desilicated liquid and the lime milk, and the polyacrylic acid ester or the polyacrylic acid salt has an addition amount of 0.05-0.5% based on total dry weight of the fly ash desilicated liquid and the lime milk.

In production process of the active calcium silicate of the present invention, according to the process technology requirements, a lime milk and a fly ash desilicated liquid that meet the demands for use are added into a reaction tank, and generally, the molar ratio of calcium to silicon in the lime milk and the fly ash desilicated liquid is 0.7-1.3:1. The fly ash desilicated liquid is extracted from a fly ash. To the fly ash desilicated liquid, a particle diameter control agent as listed above is added. The mixture is stirred thoroughly before reaction, which is capable of effectively inhibiting the generated active calcium silicate from flocculation, and thereby controlling particle diameter of the active calcium silicate.

According to the method of the present invention, the particle diameter control agent generally may be selected from polyacrylic acid ester, or a potassium or sodium salt of pyrophosphoric acid, metaphosphoric acid, polyphosphoric acid, polyacrylic acid, and the like. Specifically, it may be, for example, one of sodium diphosphate, sodium tripolyphosphate, sodium metaphosphate, sodium pyrophosphate and sodium polyacrylate.

According to the method of the present invention, the pyrophosphoric acid salt, metaphosphoric acid salt or polyphosphoric acid salt may be added in an amount of 1.5-2.5% based on total dry weight of the fly ash desilicated liquid and the lime milk.

According to the method of the present invention, the polyacrylic acid ester and the polyacrylic acid salt may be added in an amount of 0.3-0.5% based on total dry weight of the fly ash desilicated liquid and the lime milk.

According to the method of the present invention, the reaction temperature is 85-95° C., and the reaction time is 40-60 min. The above reaction temperature and reaction time is advantageous for the reaction proceeding in a more efficient and energy saving manner, and obtaining a high-quality active calcium silicate.

According to the method of the present invention, in order to make the prepared active calcium silicate more suitable for use in the papermaking process, it can be selected that quicklime used to produce the lime milk has a calcium oxide content of $\geq 52$ wt %, a magnesium oxide content of $\leq 1.5$ wt %, a silicon oxide content of $\leq 1.5$ wt %, and an acid insoluble substance content of $\leq 3.0$ wt %.

According to the method of the present invention, it further comprises sieving the resulting product slurry with a 60-150 mesh sieve. The product slurry obtained in the reaction is sieved, and then dried to advantageously remove impurity particles and nonspreaded large flocculated particles and obtain an active calcium silicate with better uniformity of particle diameter. Furthermore, the obtained active calcium silicate may be washed with clear water of 60° C. or above for several times to remove residual alkali and further enhance quality thereof.

According to the method of the present invention, the fly ash desilicated liquid has a solid content of 50-70 g/L and the lime milk has a solid content of 150-180 g/L. When the reactants with the above solid content are used, the reactants may react completely, and meanwhile the reaction may proceed efficiently and rapidly.

By adopting the method of the present invention, an active calcium silicate with excellent properties may be obtained. Generally, the active calcium silicate thus obtained has an average particle diameter of 10-40 μm, specific surface area of 100-300 m²/g, oil absorption value of 150-300 g/100 g, true density of 1.2-1.5 g/cm³, packing density of 0.15-0.30 g/cm³, and pH of 8-10 (measured under 20% solid content), and thereby is more beneficial to meeting using demand of the papermaking process.

The embodiments of the present invention at least have the following advantages:

1. The preparation method provided in present invention solves the question of the active calcium silicate having high large particle content, and meanwhile reduces the particle diameter of the active calcium silicate particles and improves product quality of the active calcium silicate, so that the active calcium silicate may meet using requirements of papermaking production. Using the method provided by the present invention, maximum particle diameter of the active calcium silicate particles is reduced from original 100 μm or bigger to 60 μm or smaller, and the content of the particles with 45 μm (325 meshes) or bigger diameter is also greatly reduced, and such active calcium silicate may fully meet papermaking requirements and eliminate the difficulty in sieving of active calcium silicate slurry and the potential risks of easy powder-dropping of paper.

2. The preparation method provided by present invention may be operated simply and flexibly based on existing active calcium silicate synthesis process without additional large equipment. Thus the preparation method has strong operability and is easy for industrialization promotion and application.

DESCRIPTION OF EMBODIMENTS

The present invention will be described in detail with reference to embodiments below. However, the present invention may be embodied in many different forms and should not be construed as limited to the embodiments set forth herein.

Embodiment 1

To a reaction tank, fly ash desilicated liquid with a solid content of 60 g/L and lime milk with a solid content of 160 g/L and sodium metaphosphate available in market were added and mixed, then reacted to obtain an active calcium silicate slurry. In this reaction, the molar ratio of calcium to silicon in the lime milk and the fly ash desilicated liquid was 1:1, the reaction temperature was controlled at about 90° C., the reaction time was 40 min, and the stirring speed was 300 r/min. The sodium metaphosphate was added in an amount of 1.0% based on total dry weight of the fly ash desilicated liquid and the lime milk. After completion of the reaction, the obtained product slurry was sieved through a 100 mesh sieve, and then the sieved slurry was dried, to obtain the active calcium silicate, which was then washed with clear water of 60° C. or above for three times to remove residual alkali.

The active calcium silicate obtained in the present embodiment had specific surface area of 100-300 m²/g, an oil absorption value of 150-300 g/100 g, true density of 1.2-1.5 g/cm³, packing density of 0.15-0.30 g/cm³, and pH value of 8-10 (measured under 20% solids content). The active calcium silicate obtained in the present embodiment was subjected to particle diameter test. The results were shown in Table 1.

Embodiment 2

An active calcium silicate was prepared using the method of Embodiment 1, except that the sodium metaphosphate was added in an amount of 1.5% based on total dry weight of the fly ash desilicated liquid and the lime milk.

The active calcium silicate obtained in the present embodiment had specific surface area of 100-300 m²/g, an oil absorption value of 150-300 g/100 g, true density of 1.2-1.5 g/cm³, packing density of 0.15-0.30 g/cm³, and pH value of 8-10 (measured under 20% solids content). The active calcium silicate obtained in the present embodiment was subjected to particle diameter test. The results were shown in Table 1.

Embodiment 3

An active calcium silicate was prepared using the method of Embodiment 1, except that the sodium metaphosphate was added in an amount of 2.0% based on total dry weight of the fly ash desilicated liquid and the lime milk.

The active calcium silicate obtained in the present embodiment had specific surface area of 100-300 m²/g, an oil absorption value of 150-300 g/100 g, true density of 1.2-1.5 g/cm³, packing density of 0.15-0.30 g/cm³, and pH value of 8-10 (measured under 20% solids content). The active calcium silicate obtained in the present embodiment was subjected to particle diameter test. The results were shown in Table 1.

Embodiment 4

An active calcium silicate was prepared using the method of Embodiment 1, except that the sodium metaphosphate was added in an amount of 2.5% based on total dry weight of the fly ash desilicated liquid and the lime milk.

The active calcium silicate obtained in the present embodiment had specific surface area of 100-300 m²/g, an oil absorption value of 150-300 g/100 g, true density of 1.2-1.5 g/cm³, packing density of 0.15-0.30 g/cm³, and pH value of 8-10 (measured under 20% solids content). The active calcium silicate obtained in the present embodiment was subjected to particle diameter test. The results were shown in Table 1.

Embodiment 5

An active calcium silicate was prepared using the method of Embodiment 1, except that a polyacrylic acid ester available in the market was used as particle diameter control agent in an amount of 0.3% based on total dry weight of the fly ash desilicated liquid and the lime milk. After completion of the reaction, the obtained product slurry was sieved through a 120 mesh sieve, and then the sieved slurry was dried, to obtain the active calcium silicate, which was then washed with clear water of 60° C. or above for three times to remove residual alkali.

The active calcium silicate obtained in the present embodiment had specific surface area of 100-300 m²/g, an oil absorption value of 150-300 g/100 g, true density of 1.2-1.5 g/cm³, packing density of 0.15-0.30 g/cm³, and pH value of 8-10 (measured under 20% solids content). The active calcium silicate obtained in the present embodiment was subjected to particle diameter test. The results were shown in Table 1.

Embodiment 6

An active calcium silicate was prepared using the method of Embodiment 5, except that the polyacrylic acid ester was added in an amount of 0.5% based on total dry weight of the fly ash desilicated liquid and the lime milk.

The active calcium silicate obtained in the present embodiment had specific surface area of 100-300 m²/g, an oil absorption value of 150-300 g/100 g, true density of 1.2-1.5 g/cm³, packing density of 0.15-0.30 g/cm³, and pH value of 8-10 (measured under 20% solids content). The active calcium silicate obtained in the present embodiment was subjected to particle diameter test. The results were shown in Table 1.

Comparative Embodiment 1

An active calcium silicate was prepared using the method of Embodiment 1, except that no particle diameter control agent was added. The active calcium silicate obtained in the present embodiment was subjected to particle diameter test. The results were shown in Table 1.

ester is used in an amount of 0.3%, the maximum particle diameter of active calcium silicate is 61.74 μm, and when the polyacrylic acid ester is used in an amount of 0.5%, the maximum particle diameter is 88.48 μm, while the average particle diameter is decreased to 18.82 μm, indicating that a smaller average particle diameter may be obtained when the polyacrylic acid ester was used in an amount within the range as described above, also a smaller content of active calcium silicate particle with large diameter can be achieved.

Finally, it should be explicated that the above embodiments is only to describe the technical solutions of the present invention, but not to limit the present invention. Although the present invention has been described in detail with reference to the above embodiments, it will be appreciated by the skilled in the art that modifications can be made to the technical solutions described in the above embodiments, or equivalent replacements of some or all of the technical features therein can be made. These modifications

TABLE 1

|  | Comparative Embodiment 1 | Embodiment 1 | Embodiment 2 | Embodiment 3 | Embodiment 4 | Embodiment 5 | Embodiment 6 |
|---|---|---|---|---|---|---|---|
| Particle diameter control agent | — | Sodium metaphosphate | | | | Polyacrylic acid ester | |
| Amount of the particle diameter control agent/% | 0 | 1.0 | 1.5 | 2.0 | 2.5 | 0.3 | 0.5 |
| Average particle diameter of active calcium silicate D50/μm | 20.95 | 20.86 | 18.46 | 18.66 | 18.90 | 20.65 | 18.82 |
| Content of active calcium silicate particle with 45 μm or more diameter/% | 6.9 | 3.5 | 2.2 | 2.1 | 2.2 | 3.0 | 4.4 |
| Maximum particle diameter of active calcium silicate/μm | 99.75 | 61.74 | 61.74 | 61.74 | 61.76 | 61.74 | 88.48 |

It can be seen from the above Embodiments and Comparative Embodiment, adding the particle diameter control agent in the amount as above during the preparation of the active calcium silicate may significantly reduce large particle content, large flocculated particles, and the average particle diameter of the active calcium silicate.

When sodium metaphosphate was used as a particle diameter control agent, average particle diameter D50 of the active calcium silicate may be reduced to a minimum of 18.46 μm, the content of the active calcium silicate particle with 45 μm or larger diameter may be reduced to a minimum of 2.1%, and maximum particle diameter of the active calcium silicate may be reduced to a minimum of 61.74 μm. This showed that when the addition amount of sodium metaphosphate was within the range as described above, a smaller average particle diameter of the active calcium silicate may be obtained and meanwhile the content of large particles thereof was reduced. Comprehensive analysis showed that the amount of sodium metaphosphate in the range of 1.5%-2.5% can achieve better application results.

In the case that a polyacrylic acid ester was used as a particle diameter control agent, when the polyacrylic acid or replacements will not make corresponding technical solutions depart from scope of the technical solutions of the above embodiments of the present invention.

What is claimed is:

1. A method for preparing an active calcium silicate, comprising: mixing a lime milk, a fly ash desilicated liquid and a particle diameter control agent and reacting them to produce a product slurry, drying the product slurry to obtain the active calcium silicate, wherein the particle diameter control agent is one of a pyrophosphoric acid salt, a metaphosphoric acid salt, a polyphosphoric acid salt, a polyacrylic acid ester, and a polyacrylic acid salt; and
   wherein the pyrophosphoric acid salt, the metaphosphoric acid salt or the polyphosphoric acid salt is added in an amount of 0.2-2.5% based on total dry weight of the fly ash desilicated liquid and the lime milk, and the polyacrylic acid ester or the polyacrylic acid salt is added in an amount of 0.05-0.5% based on total dry weight of the fly ash desilicated liquid and the lime milk.

2. The method according to claim 1, wherein the polyphosphoric acid salt is sodium diphosphate or sodium tripolyphosphate, the metaphosphoric acid salt is sodium metaphosphate, the pyrophosphoric acid salt is sodium pyrophosphate, and the polyacrylic acid salt is sodium polyacrylate.

3. The method according to claim 1, wherein the particle diameter control agent is one of the pyrophosphoric acid salt, the metaphosphoric acid salt and the polyphosphoric acid salt, which is added in an amount of 1.5-2.5% based on total dry weight of the fly ash desilicated liquid and the lime milk.

4. The method according to claim 1, wherein the particle diameter control agent is one of the polyacrylic acid ester and the polyacrylic acid salt, which is added in an amount of 0.3-0.5% based on total dry weight of the fly ash desilicated liquid and the lime milk.

5. The method according to claim 1, wherein the reaction temperature is 85-95° C., and the reaction time is 40-60 min.

6. The method according to claim 1, wherein quicklime used to produce the lime milk has a calcium oxide content of ≥52 wt %, a magnesium oxide content of ≤1.5 wt %, a silicon oxide content of ≤1.5 wt %, and an acid insoluble substance content of ≤3.0 wt %.

7. The method according to claim 1, further comprising sieving the product slurry with a 60-150 mesh sieve.

8. The method according to claim 1, wherein the fly ash desilicated liquid has a solid content of 50-70 g/L, and the lime milk has a solid content of 150-180 g/L.

9. The method according to claim 1, wherein a molar ratio of calcium to silicon in the lime milk and the fly ash desilicated liquid is 0.7-1.3:1.

* * * * *